United States Patent [19]
Yamate et al.

[11] Patent Number: 6,014,219
[45] Date of Patent: Jan. 11, 2000

[54] METHOD AND SYSTEM FOR EVALUATING THE QUALITY OF HOLOGRAMS

[75] Inventors: Takashi Yamate; Shinji Nishikawa, both of Mie, Japan

[73] Assignee: Central Glass Company, Ltd., Japan

[21] Appl. No.: 09/019,300

[22] Filed: Feb. 5, 1998

[30] Foreign Application Priority Data

Feb. 5, 1997 [JP] Japan .................................... 9-022940
Sep. 30, 1997 [JP] Japan .................................... 9-267533

[51] Int. Cl.[7] .............................. G02B 27/46; G01J 9/02
[52] U.S. Cl. ........................... 356/394; 359/559; 382/211
[58] Field of Search ............................... 359/1, 559, 560, 359/561; 356/394, 347, 324; 382/210, 211, 212

[56] References Cited

U.S. PATENT DOCUMENTS 3,782,827  1/1974  Nisenson et al. ...................... 356/376
5,040,140  8/1991  Horner .................................... 382/210
5,724,447  3/1998  Fukushima .............................. 382/211

FOREIGN PATENT DOCUMENTS 4-286932  of 1992  Japan .

*Primary Examiner*—Jon Henry
*Attorney, Agent, or Firm*—Evenson, McKeown, Edwards & Lenahan, P.L.L.C.

[57] ABSTRACT

The image quality of a hologram is evaluated by measuring the spacial distributions of luminance of an image reconstructed from the hologram and an object recorded thereon, normalizing the amplitudes of luminance per spacial frequency (which are obtained by Fourier transforms of the spacial distributions measured, respectively) and comparing the amplitudes normalized or obtaining a ratio between the amplitudes normalized.

9 Claims, 8 Drawing Sheets

METHOD AND SYSTEM FOR EVALUATING THE QUALITY OF HOLOGRAMS

BACKGROUND AND SUMMARY OF THE INVENTION

This application claims the priority of Japanese Patent Application Nos. 9-22940 and 9-267533, the disclosures of which are expressly incorporated by reference herein.

The present invention relates to a method and a system for evaluating the image quality of holograms.

Generally, the evaluation of the image quality of holograms is accomplished visually. Thus, this evaluation was usually performed non-quantitatively often producing a wide dispersion due to differing perceptions of the observers, and conditions under which the observations were made.

Regarding optical parts such as a mirror and a lens, the distribution of intensity of a point image is observed to evaluate its modulation transfer functions (referred hereinafter as MTF). In view of the fact that such known evaluation methods using MTF cannot be applied to the evaluation of hologram images, JP-A 4-286932 proposes a new evaluation method wherein a real image of a hologram is formed through a convex lens arranged on the side of a light source or diffracted light to operate and evaluate MTF.

However, the method disclosed in JP-A 4-286932 serves to measure a point spread function (PSF), so that it can evaluate MTF of holographic opticall elements which reflect two-dimensional images and serve as a combiner of a headup display. This method, however, cannot evaluate the three-dimensional image quality of holograms.

It is, therefore, an object of the present invention to provide a method and a system for evaluating not only the quality of holograms with two-dimensional recorded images, but the quality of holograms with three-dimensional recorded images.

One aspect of the present invention lies in providing a method of evaluating a hologram, comprising the steps of:
measuring spacial distributions of luminance of an image reconstructed from the hologram and an object recorded thereon;
normalizing amplitudes of luminance per spacial frequency, which are obtained by Fourier transforms of said spacial distributions measured, respectively; and
comparing the normalized amplitudes.

Another aspect of the present invention lies in providing a method of evaluating a hologram, comprising the steps of:
measuring spacial distributions of luminance of an image reconstructed from the hologram and an object recorded thereon;
normalizing amplitudes of luminance per spacial frequency, which are obtained by Fourier transforms of said spacial distributions measured, respectively; and
obtaining a ratio between the normalized amplitudes.

Still another aspect of the present invention lies in providing a system for evaluating a hologram, comprising:
a source illuminating light to the hologram and an object recorded thereon; and
a luminance meter movably arranged with respect to the hologram and said object, said luminance meter serving to measure luminances of an image reconstructed from the hologram and light reflected by said object.

Other objects, advantages and novel features of the present invention will become apparent from the following detailed description of the invention when considered in conjunction with the accompanying drawings.

Figure 1:
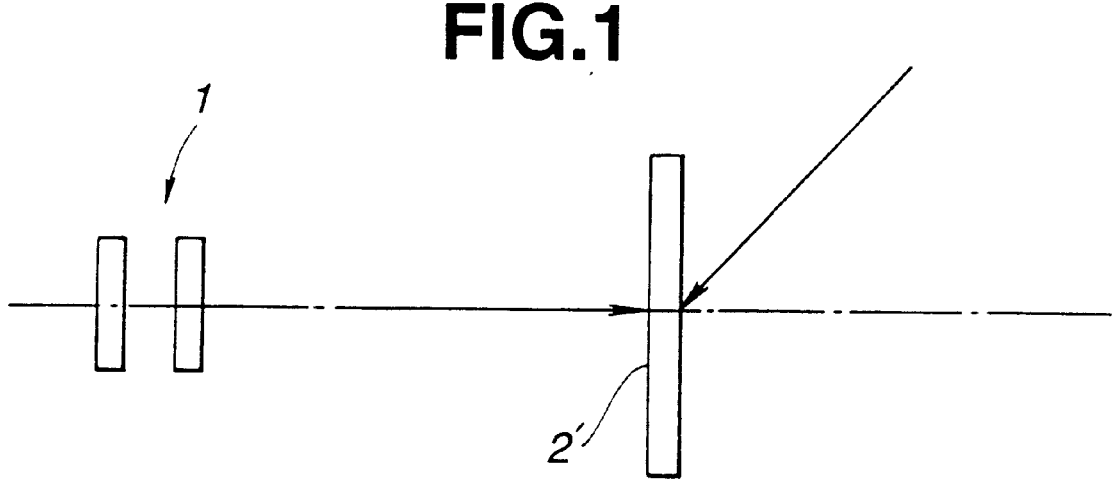
FIG. 1 is a schematic view showing an optical system for obtaining a hologram with three-dimensional image.

DETAILED DESCRIPTION OF THE DRAWINGS:

The evaluation of the quality of holograms is carried out as follows:

First, the spacial distributions of luminance of light reflected by an object and an image reconstructed from a hologram are measured.

Second, assumption is made that measured values of the spacial distribution of luminance are one-dimensional data having N in number and equidistantly measured, wherein N is an even number. When showing measured values $f(0), f(1), \ldots, f(N-1)$ by Fourier series, a formula (1) is given:

$$f(k) = \frac{a_o}{2} + \sum_{n=1}^{N/2-1} \{a_n \cos(2\pi nk/N) + b_n \sin(2\pi nk/N)\} + \frac{a_{N/2}}{2}\cos(k\pi) \quad (1)$$

where $a_n$ and $b_n$ are given by formulae (2) and (3) which are Fourier coefficients:

$$a_n = \frac{2}{N}\sum_{k=0}^{N-1} f(k)\cos(2\pi nk/N) \quad (0 \leq n \leq N/2) \quad (2)$$

$$b_n = \frac{2}{N}\sum_{k=0}^{N-1} f(k)\sin(2\pi nk/N) \quad (1 \leq n \leq N/2-1) \quad (3)$$

Assuming that $b_D=0$ and $b_{N/2}=0$, the formula (1) can be transformed into a formula (4):

$$f(k) = \frac{c_o}{2} + \sum_{n=1}^{N/2-1} c_n \cos\left\{\frac{2\pi nk}{N} - \arctan\left(\frac{b_n}{a_n}\right)\right\} + \frac{c_{N/2}}{2}\cos k\pi \quad (4)$$

where $c_n$ is given by a formula (5):

$$c_n = (a_n^2 + b_n^2)^{1/2} (0 \leq n \leq N/2) \quad (5)$$

$a_n$, $b_n$, and $c_n$ are called a discrete Fourier transform of the spacial distribution $f(x)$ of luminance, each showing the amplitude of the luminance of fundamental wave and higher harmonic waves.

A normalized amplitude $<c_n>$ obtained by normalizing an average of the luminance amplitude is defined by a formula (6) wherein the discrete Fourier transform $c_n$ is divided by the discrete Fourier transform $c_0$ when n=0:

$$\langle c_n \rangle = \frac{c_o}{c_n} \quad (0 \leq n \leq N/2) \tag{6}$$

The normalized amplitude $<c_n>$ is determined with regard to the object and the hologram. And based on whether or not two values of the normalized amplitude $<c_0>$ are substantially equal to each other, the quality of the reconstructed image is evaluated.

Here, the normalized amplitude $<c_n>$ means a luminance amplitude converted in such a way that an average of the spacial distribution of luminance is ½. Therefore, by determining the normalized amplitude $<c_n>$ out of measured data on the spacial distributions of luminance of the object and the reconstructed image, the distributions of luminance amplitude with respect to the spacial frequency of the two can be compared with each other under the same average even if the measured data are different in magnitude.

In other words, the distributions of luminance amplitude with respect to the spacial frequency of the object and the reconstructed image can be compared with each other regardless of the magnitudes of the luminance of reconstructing light and illuminating light upon measurement of the spacial distributions of luminance of the reconstructed image and the object. Moreover, with the normalized amplitude $<c_n>$, the quality can be compared between different reconstructed images of the same object.

Third, a normalized amplitude ratio (refer hereafter to as NAR) is determined by comparing the normalized amplitudes $<c_n>$. Specifically, when the normalized amplitudes $<c_n>$ of the reconstructed image and the object are given by $<c_i>$ and $<c_s>$, NAR of a three-dimensional hologram can be given by $<c_i>/<c_s>$. The quality of a reconstructed image is evaluated based on whether or not NAR is approximate to 1.

NAR determined in such a way is a criterion for the quality of a reconstructed image, which is given by the ratio of the normalized amplitude of a reconstructed image to that of an object. NAR, which is given on the basis of the normalized amplitude $<c_n>$ of an object, shows the difference between an apparent object and a reconstructed image without relying on the shape of the object. This enables a comparison of the quality of reconstructed images even between holograms having different objects recorded.

An apparatus for measuring the distributions of luminance of an object recorded on a hologram and an image reconstructed from the hologram may include a light source for applying light to the object or the hologram, and a device for measuring the luminance of the object or the reconstructed image.

The luminance measuring device may include a photoelectric converter wherein the luminance of a real image of a hologram is measured, which is formed through a convex lens arranged on the side of a light source or diffracted light as disclosed in JP-A 4-286932. However, the luminance measuring device may include preferably a luminance meter including a convex lens, an aperture, etc. in view of achieving a simple optical measuring system and easy setting operation.

The light source may include a white light source such as a tungsten halogen lamp, and a laser light source.

Figure 2A:
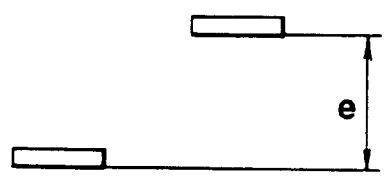
FIG. 2A is a plan view showing an object.
Figure 2B:
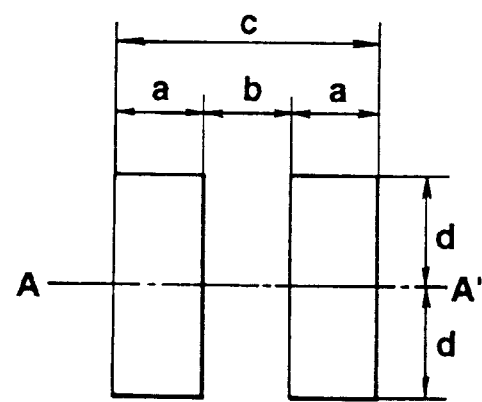
FIG. 2B is a front view showing the object.

Referring to FIGS. 1–9, the present invention will be described in detail. Referring first to FIGS. 1–2B, an object 1 includes two plates, each having a width a off 10 mm and a height 2d of 50 mm. The two plates are disposed a distance b of 10 mm apart in the cross direction as shown in FIG. 2B and a distance e of 100 mm apart in the direction from front to back as shown in FIG. 2A. It is thus understood that a distance c in FIG. 2B is 30 mm. Using an optical system as shown in FIG. 1, the object 1 is illuminated by laser beam to expose a dry plate 2' having as a sensitive material OmniDex-352 manufactured by E. I. duPont de Nemours & Co. Inc., obtaining a hologram with three-dimensional image recorded.

Figure 3:
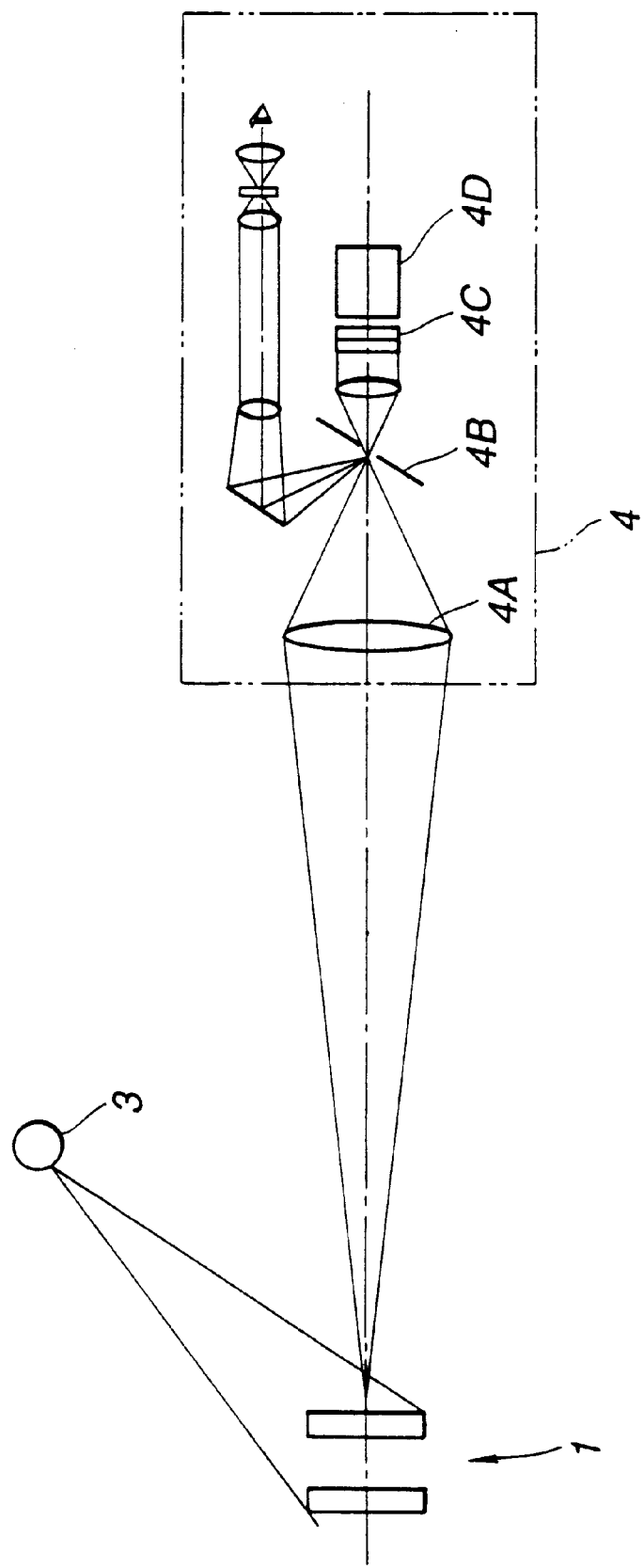
FIG. 3 is a schematic plan view showing an optical system for measuring the luminance of the object.
Figure 4:
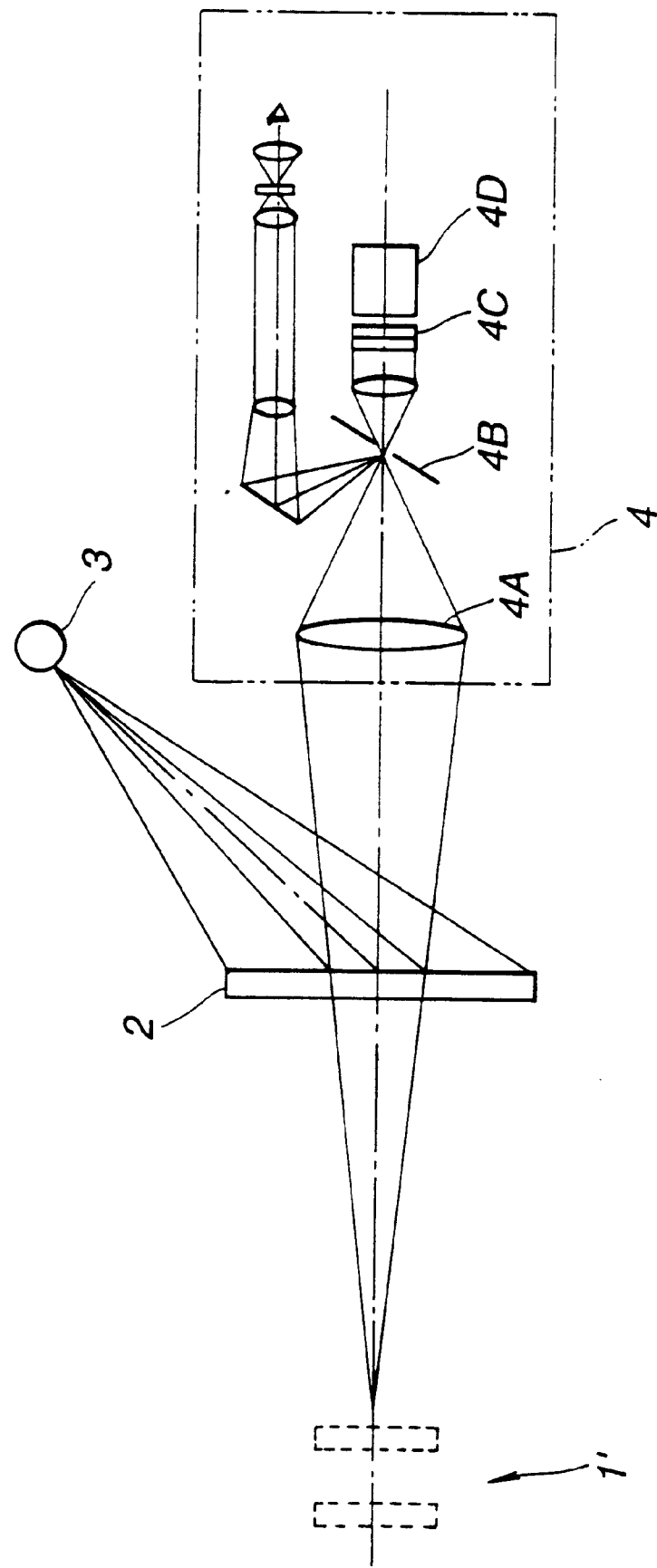
FIG. 4 is a view similar to FIG. 3, showing an optical system for measuring the luminance of an image reconstructed from the hologram.

Using an optical system as shown in FIGS. 3–4, the quality of the hologram 2 is evaluated by measuring the distributions of luminance of the object: 1 and an image reconstructed from the hologram 2. Since the shape of the object 1 is relatively simple in this embodiment, the distributions of luminance of the object 1 and the reconstructed image are measured only along the line A–A' as shown in FIG. 2B.

Figure 5:
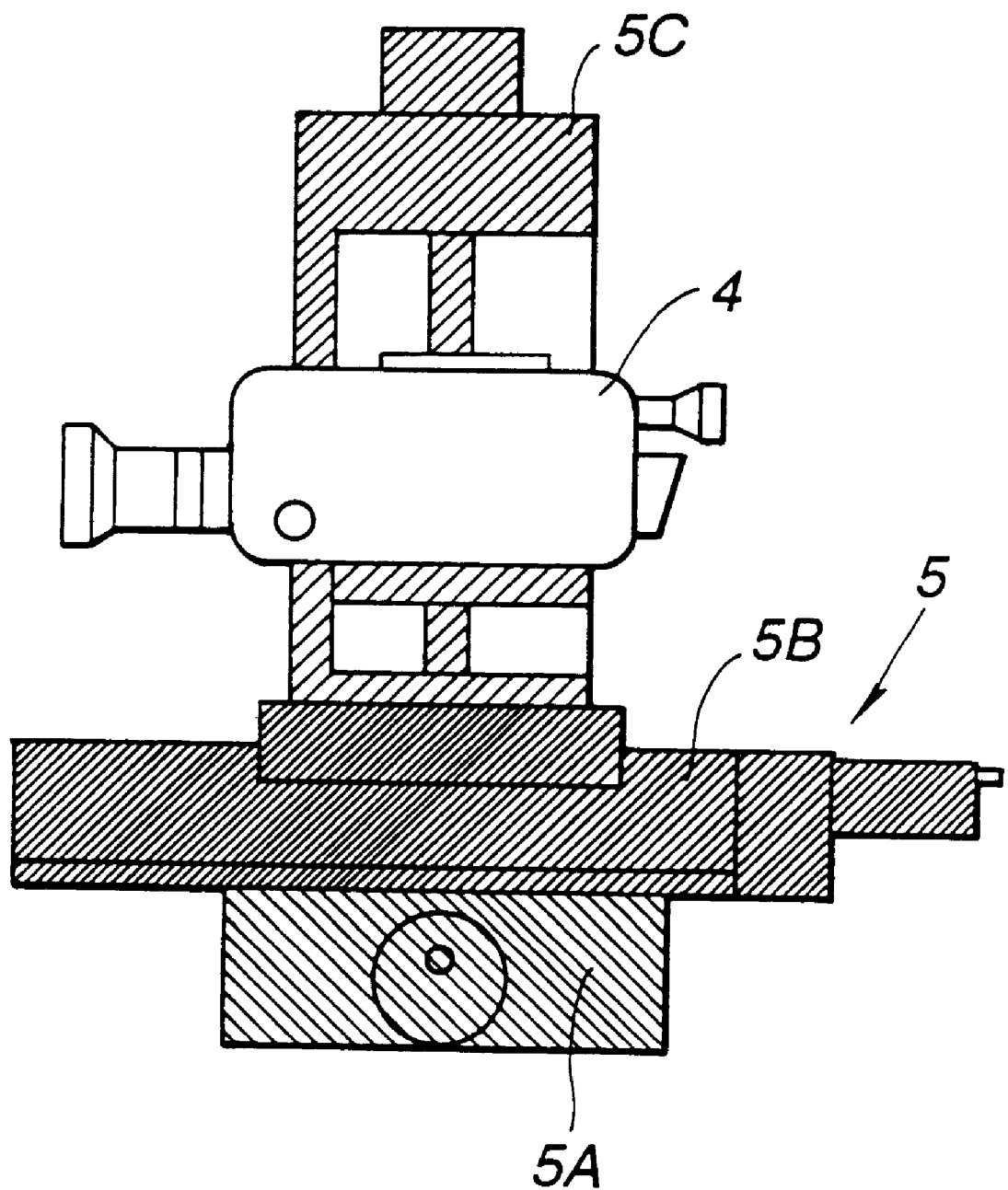
FIG. 5 is a side view showing a quality evaluating device.

Referring to FIG. 5, a quality evaluating device comprises a luminance meter 4 mounted on a precision stage 5. As shown in FIGS. 3–4, the luminance meter 4 includes therein an object lens 4A, an aperture mirror 4B having a small hole in the center, a diffuse transmission plate 4C, and a photoelectric element 4D. As shown in FIG. 5, the precision stage 5 includes three-axis parts, i.e., an X-axis part 5A (movable in the x-axis direction or in the vertical direction of the object 1 or the reconstructed image), a y-axis part 5B (movable in the y-axis direction or in the direction from front to back of the object 1 or the reconstructed image), and a z-axis part 5C (movable in the z-axis direction or in the cross direction of the object 1 or the reconstructed image).

Referring to FIG. 3, when measuring the luminance of the object 1, the object 1 is illuminated by light of a light source 3, which gives reflected light that is then incident on the luminance meter 4. The distribution of luminance of the object 1 along the line A–A' in FIG. 2B is measured by moving the is luminance meter 4 in the cross direction of the object 1 by driving the z-axis part 5C of the precision stage 5.

In a similar way, referring to FIG. 4, when measuring the luminance of the reconstructed image, the hologram 2 is illuminated by light of the light source 3, which gives diffracted light that is then incident on the luminance meter 4. The distribution of luminance of the reconstructed image is measured by moving the luminance meter 4 in the cross direction of the hologram 2 by driving the z-axis part 5C of the precision stage 5 along the line A–A' (see FIG. 2B).

When measuring the distribution of luminance from left to right, as viewed in FIG. 2B, the focus of the luminance meter 4 with regard to the position displaced leftward of the line A–A' is adjusted on the left object 1 or reconstructed image. Then, the y-axis part 5 of the precision stage 5 is moved forward with respect to the center of the object 1 or the reconstructed image to switch the focused position from the left object 1 or reconstructed image to the right object 1 or reconstructed image. The distribution of luminance in the position displaced rightward of the right object 1 or reconstructed image is measured with the luminance meter 4 focused on the right object 1 or reconstructed image.

Figure 6:
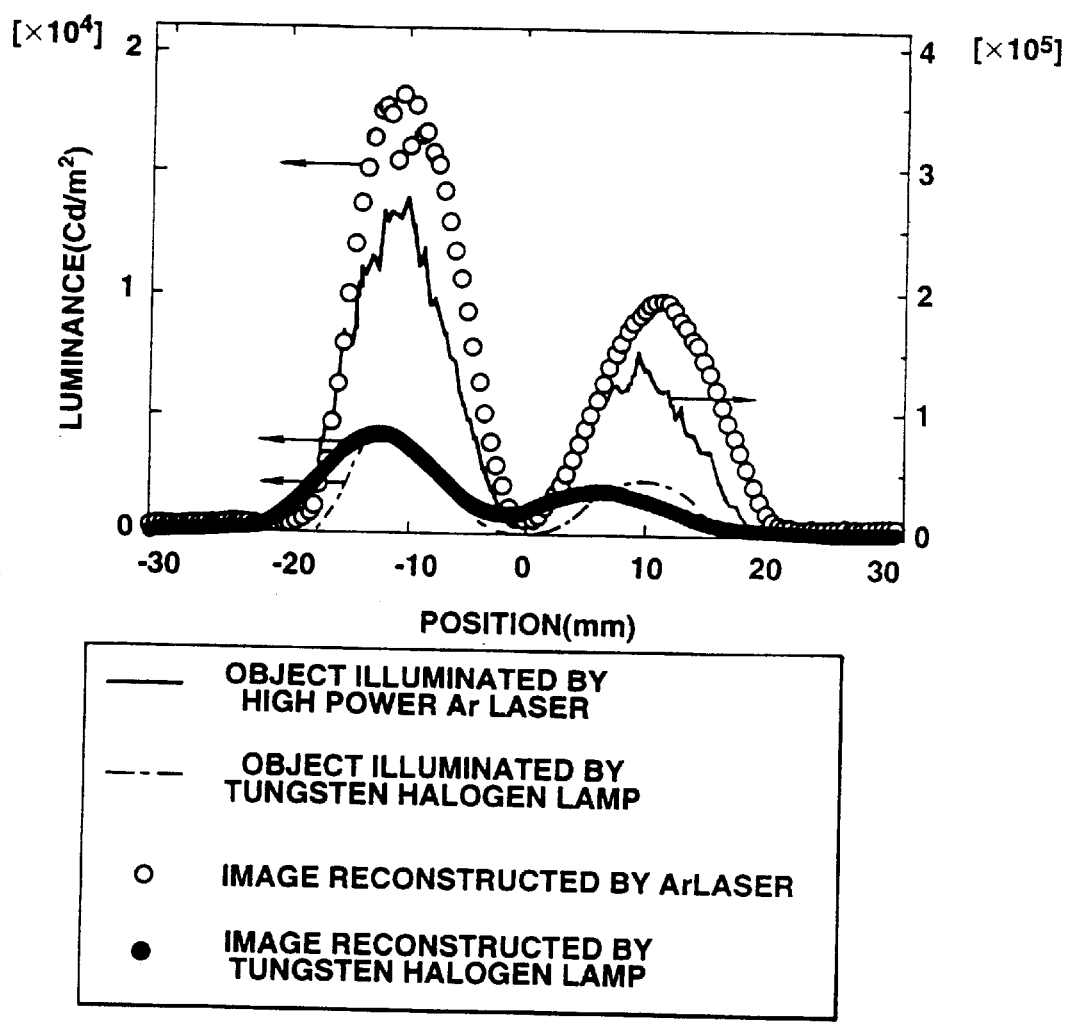
FIG. 6 is a graph illustrating the luminance of the object and the reconstructed image.

Referring to FIG. 6, the distribution of luminance of the object 1 is obtained by using two different light sources 3, i.e., a high power Ar laser and a tungsten halogen lamp. The results with the high power Ar laser and the tungsten halogen lamp are given by the fully-drawn and one-dot chain lines, respectively, which reveals that the luminance is high in a portion corresponding to the object 1. Note that the position of 0 mm in FIG. 6 corresponds to the middle between the two plates of the object 1 as shown in FIG. 2B. Likewise, the distribution of luminance of the reconstructed image is obtained by using two different light sources 3, i.e., an Ar laser and a tungsten halogen lamp. The results with the Ar laser and the tungsten halogen lamp are shown by curves given by the white and black circles, respectively. This reveals that the luminance is high in a reconstructed portion of the object 1.

Figure 7:
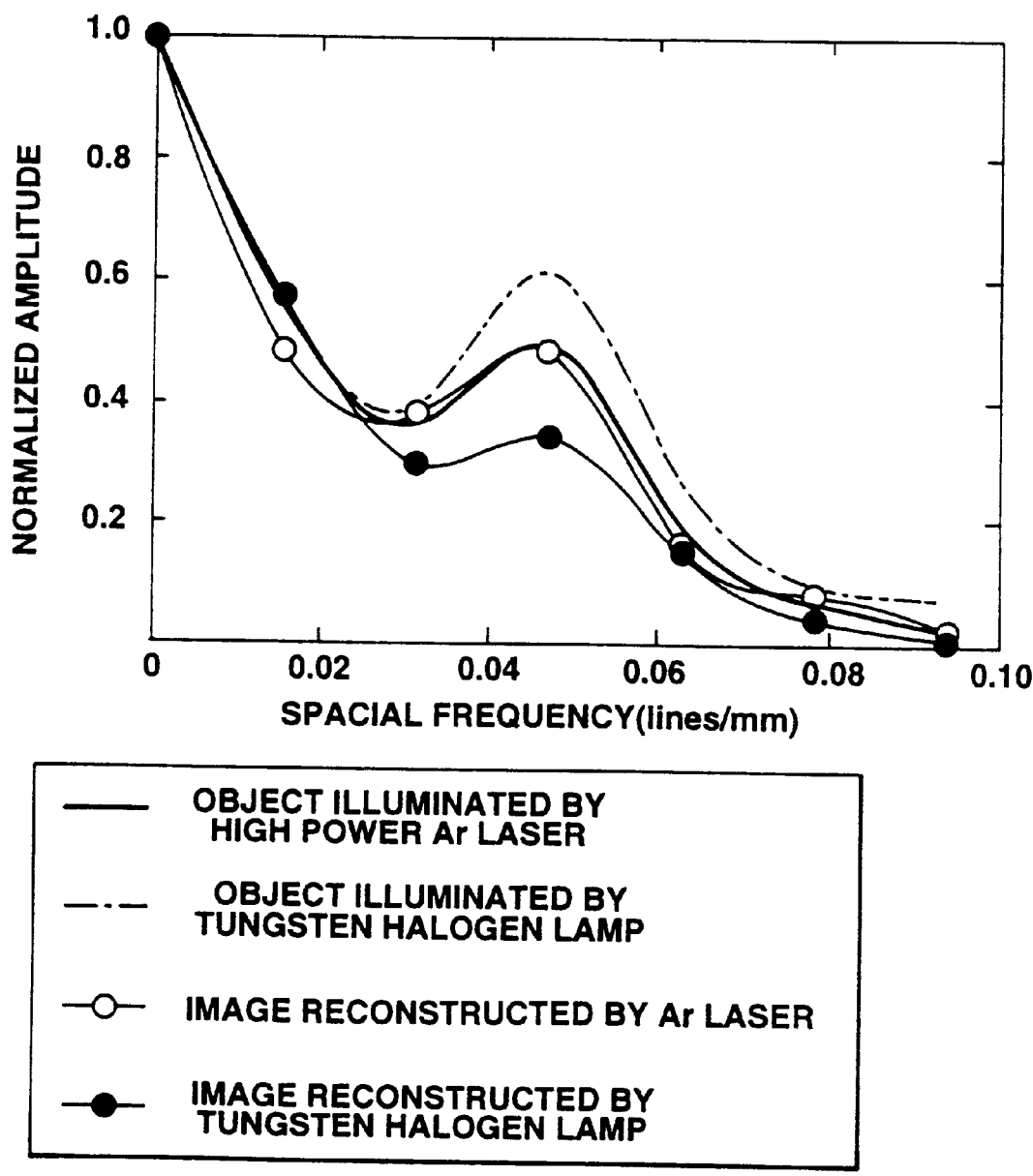
FIG. 7 is a view similar to FIG. 6, illustrating normalized amplitudes of the luminance of the object and the hologram.

Referring to FIG. 7, in accordance with the aforementioned procedure, the relationship between the normalized amplitude with respect to the spacial frequency is obtained by using two different light sources 3, i.e., an Ar laser and a tungsten halogen lamp. The results of the object 1 are given by the fully-drawn and one-dot chain lines, whereas the results of the reconstructed image are given by the line with white circles and the line with black circles. A variation in normalized amplitude of the object 1 with the two light sources 3 is due to the remarkable difference in luminance of the light sources 3.

Experiment reveals, not shown in FIG. 7, that when illuminated by the laser, but with low luminance, the normalized amplitude of the object 1 is the same as when illuminated by the tungsten halogen lamp. Regarding the reconstructed image, the normalized amplitude is distinctly different between the laser and the tungsten halogen lamp.

Thus, according to the above method, the difference in sight of the object 1 and the reconstructed image due to the means of illumination and reconstruction can be shown quantitatively by the normalized amplitude.

Referring again to FIG. 7, when using the laser as the light source 3, the normalized amplitude of the object 1 given by the fully-drawn line is substantially equal to that of the reconstructed image given by the line with white circles, which corresponds to the visual evaluation of the object 1 and the reconstructed image.

According to the visual evaluation, the object 1 illuminated by the tungsten halogen lamp can be seen clearly, but the image reconstructed by the tungsten halogen lamp cannot. On the other hand, according to the evaluation based on the normalized amplitude, the amplitude of the object 1 illuminated by the tungsten halogen lamp is high, whereas the amplitude of the image reconstructed by the tungsten halogen lamp is low. Those results reveal that the evaluation based on the normalized amplitude explicitly corresponds to the visual evaluation.

Figure 8:
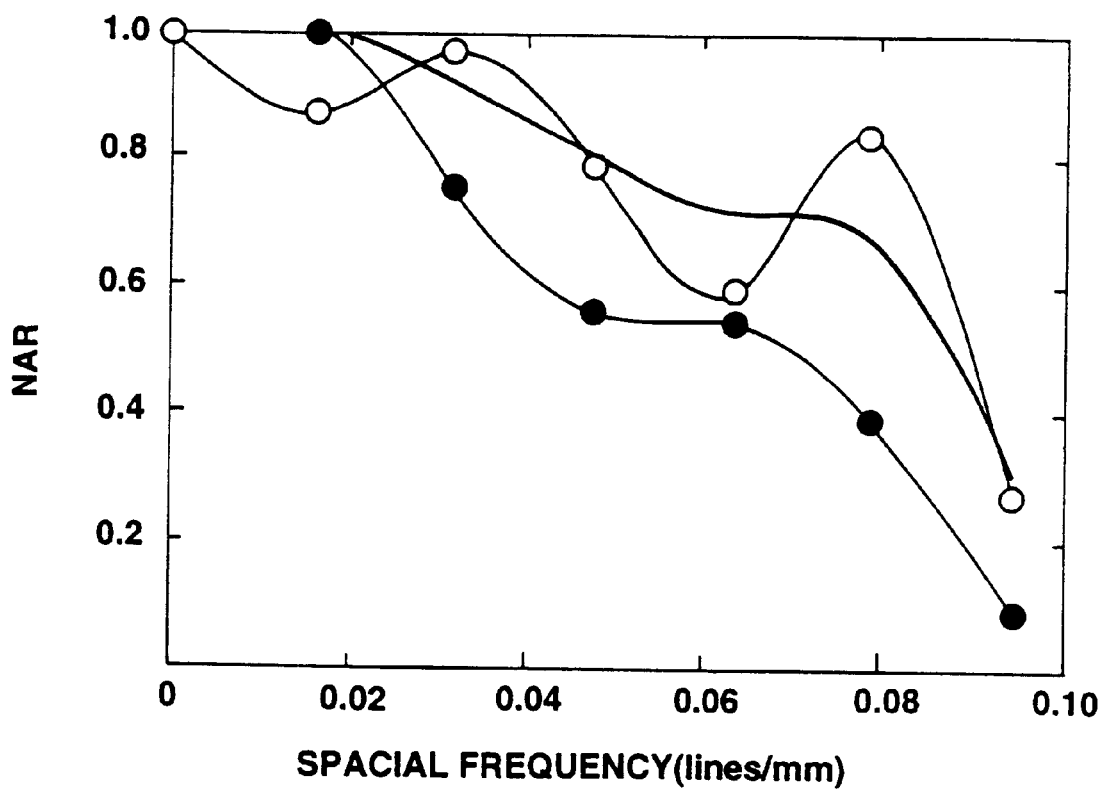
FIG. 8 is a view similar to FIG. 7, illustrating normalized amplitude ratios of the object and the hologram.

Next, referring to FIG. 8, NAR of the reconstructed image with respect to the object 1 illuminated by the tungsten halogen lamp is obtained. NAR of the object 1 illuminated by a high power Ar laser is given by the fully-drawn line. NAR of the image reconstructed by the Ar laser is given by the line with white circles. And NAR of the image reconstructed by the tungsten halogen lamp is given by the line with black circles.

As seen in FIG. 8, with respect to the spacial frequency of 0 to 0.1 lines/mm, NAR of the object 1 illuminated by the high power Ar laser corresponds substantially to NAR of the image reconstructed by the Ar laser, which shows that the reconstructed image is seen just like the object 1 illuminated by the high power Ar laser. Those NARs are smaller than 1.0, however, which shows that they are seen less clearly than the object 1 illuminated by the tungsten halogen lamp.

Moreover, NAR of the image reconstructed by the tungsten halogen lamp is lower than NAR of the object 1 illuminated by the high power Ar laser and NAR of the image reconstructed by the Ar laser, which shows that the quality of the image reconstructed by the tungsten halogen lamp is lower than the quality of the object 1 illuminated by the high power Ar laser and the image reconstructed by the Ar laser.

Those results reveal that the evaluation based on NAR quite corresponds to those of the above visual evaluation.

Note that the fundamental spacial frequency $\xi$ can be given by $\xi=1/N\delta$ where $\delta$ is a measured interval of discrete data, and N is the number of data. Assuming that a measured range of data is L, L is given by $L=N\delta$, so that the fundamental spacial frequency $\xi$ can be given by $\xi=1/L$. The spacial frequency is n times as many as the fundamental spacial frequency or equal to $n\xi$ where n is identical to n in the formulae (1)–(6), which is a whole number and is given by $0 \leq n \leq N/2$.

Figure 9:
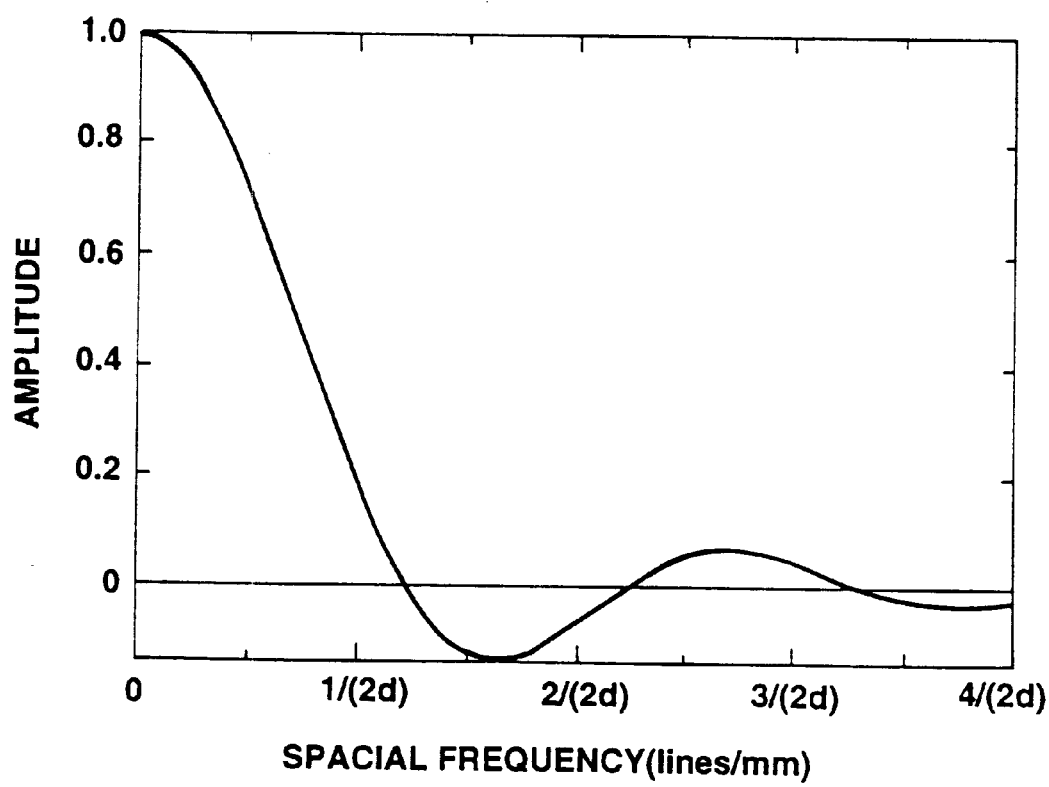
FIG. 9 is a view similar to FIG. 8, illustrating the relationship between the spacial frequency and the Fourier transform of a transmission coefficient of a circular stop.

Referring to FIG. 9, the luminance meter 4 will be described in detail. Generally, the luminance meter 4 has a visual angle of 0.1°, 0.2°, 1.0°, and 2.0°, and a narrow selectable range of the aperture diameter, which causes difficult selection of the diameter for a measured point in view of irregularities of the surface of the reconstructed image and the object 1, a measured distance, etc. When the diameter is large compared with such irregularities, the luminance amplitude measured in a higher spacial-frequency range is decreased. Thus, the evaluation of NAR of the three-dimensional holograms is effective only in a lower spacial-frequency range.

By way of example, with the measured distance of 1 m and the visual angle of 0.1°, the diameter is 1.7 mm. It is thus understood that at this visual angle, irregularities of the surface of the reconstructed image and the object 1 smaller than 1.7 mm make the evaluation of NAR difficult to take place.

Due to the fact that the measurement of the distribution of luminance requires a sufficient luminous energy, the stop diameter of the aperture mirror 4B is finite. Then, the luminance amplitude obtained by measurement of the distribution of luminance is influenced by the stop diameter.

A luminance amplitude $<c'_n>$ obtained by measurement can be given by $<c'_n>=<c_n> \cdot <s_n>$ where $<c_n>$ is the luminance amplitude to be obtained by measurement with an infinitely small diameter for a measured point, and $<s_n>$ is the Fourier transform of a transmission coefficient of the circular stop. Note that $<c'_n>$, $<c_n>$, and $<s_n>$ are all normalized.

Assuming that the stop of the luminance meter 4, which is circular, has a radius d, the Fourier transform $<s_n>$ of the above transmission coefficient: is given by a formula (7):

$$<S_n>=J_1(2\pi dn\xi)/(\pi dn\xi) \tag{7}$$

where $\xi$ is the fundamental spacial frequency, and $n\xi$ is the spacial frequency, and $J_1$ is the first kind and first order Bessel function. FIG. 9D shows the relationship between $n\xi$ and $<S_n>$.

When the spacial frequency is small, $<s_n>$ is close to 1, the luminance amplitude $<c'_n>$ obtained by measurement is substantially equal to $<c_n>$. As the spacial frequency is larger, $<c'_n>$ becomes different from $<c_n>$. Nevertheless, if $<c'_n>$ and $<s_n>$ are known, $<c_n>$ can be obtained. However, if $<S_n>$ is too small, the difference becomes greater between $<c'_n>$ and $<c_n>$, resulting in lowered accuracy of measurement.

Practically, if $<s_n>$ is larger than 0.2, $<c_n>$ can be obtained accurately by correcting the measured value $<c'_{n>\ by\ <sn>}>$. Thus, the spacial frequency should be smaller than $1/(2d)$ from the formula (7) and FIG. 9. That is, the relationship given by a formula (8) should be formed:

$$n\xi < \tfrac{1}{2}d \tag{8}$$

Assuming that the resolution of human eyes is 5 lines/mm, the luminance amplitude with the spacial frequency of at least 5 lines/mm should be evaluated in the evaluation of the quality. Then, the radius d of the measured point is 0.1 mm from the formula (8).

The relationship between a visual angle θ of the luminance meter 4, a measured distance 1, and a diameter 2d of the measured point is given by tan θ=2d/1.

The distance between an observer and the reconstructed image is generally about 1 m. Assuming that the measured distance for the distribution of luminance is the same as this, the visual angle of the luminance meter 4 is preferably equal to 0.01° or less.

Having described the present invention in connection with the preferred embodiment, it is noted that the present invention is not limited thereto, and various changes and modifications can be made without departing from the scope of the present invention.

What is claimed is:

1. A method of evaluating a hologram, comprising the steps of:

measuring spacial distributions of luminance of an image reconstructed from the hologram and an object recorded thereon;

obtaining Fourier transforms of said measured spacial distributions, respectively;

normalizing said obtained Fourier transforms per spacial frequency, respectively;

comparing said normalized Fourier transforms; and obtaining a ratio between said normalized Fourier transforms.

2. A method of evaluating a hologram, comprising the steps of:

measuring spacial distributions of luminance of an image reconstructed from the hologram and an object recorded thereon;

obtaining Fourier transforms of said measured spacial distributions, respectively;

normalizing said obtained Fourier transforms per spacial frequency, respectively; and obtaining a ratio between said normalized Fourier transforms.

3. A system for measuring image quality of a hologram, comprising:

a light source for illuminating the hologram, and for separately illuminating an object recorded thereon;

a stage, said stage being movable in X-axis, Y-axis, and Z-axis directions with respect to the hologram and said object; and a luminance meter mounted on said stage, and adapted to measure separately, luminances of an image reconstructed from the hologram, and light reflected by said object.

4. A system as claimed in claim 3, wherein said luminance meter is focused on a measured point of one of the hologram and said object with a diameter of said measured point kept constant.

5. A system as claimed in claim 4, wherein said luminance meter has a visual angle of 0.01° or less.

6. A method of measuring image quality of a hologram, comprising the steps of:

measuring a spacial distribution of luminance of an object reconstructed from the hologram;

measuring a spacial distribution of luminance of an object recorded thereon on said hologram;

obtaining amplitudes indicative of intensities of a fundamental wave and higher harmonics of the spacial distributions of the luminance as a discrete Fourier transform for the reconstructed objects;

obtaining amplitudes indicative of intensities of a fundamental wave and higher harmonics of the spacial distributions of the luminance as a discrete Fourier transform for the recorded object;

obtaining a normalized amplitude by normalizing an average of the amplitude of the spacial distribution of the luminance in the reconstructed object, and in the recorded object;

comparing the normalized amplitude and spacial distribution of the luminance of the reconstructed object to the normalized amplitude and spacial distribution of luminance in the recorded object;

storing a result of the comparisons as a value representing the image quality of the hologram.

7. A method as claimed in claim 1, wherein said normalizing step is carried out by means of dividing by two times average luminance of said image and said object.

8. A method as claimed in claim 2, wherein said normalizing step is carried out by means of dividing by two times average luminance of said image and said object.

9. The system according to claim 3, further comprising:

means for comparing normalized amplitude and spacial distribution of intensity of measured luminance of said reconstructed image and measured luminance reflected from said object as a measure of said image quality.

* * * * *